US008682607B2

(12) United States Patent
Yamada et al.

(10) Patent No.: US 8,682,607 B2
(45) Date of Patent: Mar. 25, 2014

(54) MOTION STATE DETECTION METHOD AND MOTION STATE DETECTOR (75) Inventors: Hideaki Yamada, Shimosuwa-machi (JP); Michihiro Nagaishi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 616 days.

(21) Appl. No.: 13/027,894

(22) Filed: Feb. 15, 2011

(65) Prior Publication Data
US 2011/0202304 A1    Aug. 18, 2011

(30) Foreign Application Priority Data
Feb. 15, 2010   (JP) ................................. 2010-029844

(51) Int. Cl.
*G01P 15/00*       (2006.01)
(52) U.S. Cl.
USPC ......................................................... 702/141
(58) Field of Classification Search
USPC .................... 702/79, 141, 142, 149, 150, 176
See application file for complete search history.

(56) References Cited

U.S. PATENT DOCUMENTS 3,742,767 A * 7/1973 Bernard et al. ............ 73/514.18
5,965,855 A * 10/1999 Tanazawa et al. .... 200/61.45 M
6,612,157 B2 * 9/2003 Urano et al. ................. 73/65.01
8,504,327 B2 * 8/2013 Yamada et al. ............... 702/189
2005/0104853 A1 * 5/2005 Sitalasai et al. ............... 345/163
2011/0018554 A1 * 1/2011 Yamada et al. ............... 324/649
2011/0098979 A1 * 4/2011 Yamada et al. ............... 702/189

FOREIGN PATENT DOCUMENTS

EP              857977 A1 * 8/1998 ........... G01P 15/135
JP     2004-081632 A    3/2004

* cited by examiner

*Primary Examiner* — John E Breene
*Assistant Examiner* — Yaritza H Perez Bermudez
(74) *Attorney, Agent, or Firm* — Kilpatrick Townsend & Stockton LLP (57) ABSTRACT

A motion state detection method which uses a pair of electrodes, facing each other to fix mutual positional relationship, and a movable spherical conductor disposed between the pair of electrodes, putting the pair of electrodes into either a conduction state or a non-conduction state, includes: defining a plurality of level values determined by the proportion of a duration of the conduction state in a unit time period and calculating a level value in the unit time period among the plurality of level values as a first level value; adding a second predetermined value to the first level value to calculate a second level value; and calculating the sum of squares of a plurality of first level values in a plurality of consecutive unit time periods as a first detection value and calculating the sum of squares of a plurality of second level values as a second detection value.

6 Claims, 7 Drawing Sheets

MOTION STATE DETECTION METHOD AND MOTION STATE DETECTOR

BACKGROUND

1. Technical Field

The present invention relates to a motion state detection method and a motion state detector.

2. Related Art

The motion state of an object is often detected by an acceleration sensor or an angular velocity sensor attached to the object. The target of the motion state detection may be an automobile, an airplane, a ship, an industrial robot, and the like. Since such a target must be controlled accurately, it is important to increase the detection precision of sensors. However, in many cases, the amount of power consumption does not matter since the sensors are used in an environment where power can be continuously supplied at all times.

Besides the detection targets mentioned above, JP-A-2004-81632 proposes an invention which aims to monitor the state of a person and in which an acceleration meter is attached to the body of the person. In such a case, a power supply source such as a battery is installed in the acceleration meter. However, since the acceleration sensor or the angular velocity sensor consumes power at all times, it may be troublesome for users to frequently replace the power supply source.

Given the above, in an application that aims to monitor the state of a person, it is desirable to decrease the power consumption. Besides the application aiming to monitor the person's state, in consideration of future environmental concerns, it is desirable to develop a sensor and a detector having the same application which consume less power than an existing sensor and a detector having the same application.

SUMMARY

An advantage of some aspects of the invention is to provide a motion state detection method and a motion state detector which uses a sensor consuming less power than an existing sensor and a detector having the same application, and the invention can be implemented as the following forms or application examples.

APPLICATION EXAMPLE 1

According to this application example of the invention, there is provided a motion state detection method which uses a pair of electrodes disposed so as to face each other so that mutual positional relationship is fixed, and a movable spherical conductor disposed between the pair of electrodes so as to put the pair of electrodes into either a conduction state or a non-conduction state, the method including: defining a plurality of level values which is determined by the proportion of a duration of the conduction state in a unit time period and calculating a level value in the unit time period among the plurality of level values as a first level value; adding a second predetermined value to the first level value to calculate a second level value; and calculating the sum of squares of a plurality of first level values in a plurality of consecutive unit time periods as a first detection value and calculating the sum of squares of a plurality of second level values as a second detection value, wherein when the first detection value is equal to or smaller than a first predetermined value, the first detection value is used as a measurement value, and wherein when the first detection value is larger than the first predetermined value, the second detection value is used as the measurement value.

According to this method, it is possible to calculate the acceleration using a sensor which consumes less power and which includes a pair of electrodes disposed so as to face each other so that mutual positional relationship is fixed, and a movable spherical conductor disposed between the pair of electrodes so as to put the pair of electrodes into either a conduction state or a non-conduction state. By calculating the first and second detection values and using the second detection value as the measurement value when the first detection value is larger than the first predetermined value, it is possible to broaden the calculation range of the acceleration. The sensor is configured so that the spherical conductor is more likely to adhere to the electrodes as the applied acceleration increases. Thus, the number of changes in the sensor output in a unit time period has a certain upper limit. Therefore, the first detection value calculated based on the first level value has a certain upper limit. When the value of the acceleration of an object to which the sensor is attached is equal to or larger than the first predetermined value, the difference between the first detection value and the value of the acceleration of the sensor-attached object increases gradually. The first predetermined value is a value at which the difference between the first detection value and the value of the acceleration of the sensor-attached object cannot be ignored. Therefore, by using the second detection value, as the measurement value, which is calculated based on the second level value obtained by adding the second predetermined value to the first level value at the point in time when the first detection value is larger than the first predetermined value, it is possible to increase the upper limit of the acceleration measurement range to be larger than the first predetermined value, thus broadening the measurement range. The second predetermined value is a value which is determined by the pattern of changes of the signal representing the conduction state of the sensor. The first and second predetermined values can be calculated through experiments or simulations, for example.

APPLICATION EXAMPLE 2

In the motion state detection method according to the application example, it is preferable that at least one of a change from the conduction state to the non-conduction state and a change from the non-conduction state to the conduction state is detected as a detection state, and the second predetermined value is determined based on a detection count of the detection state.

According to this method, since the spherical conductor is more likely to adhere to the pair of electrodes for a longer period as the acceleration increases, and thus, the detection count of the detection state decreased accordingly, the second predetermined value can be determined based on the detection count of the detection state.

APPLICATION EXAMPLE 3

According to this application example of the invention, there is provided a motion state detection method which uses a pair of electrodes disposed so as to face each other so that mutual positional relationship is fixed, and a movable spherical conductor disposed between the pair of electrodes so as to put the pair of electrodes into either a conduction state or a non-conduction state, the method including: defining a plurality of first level values which is determined by the proportion of a duration of the conduction state in a first unit time period and calculating a first level value in the first unit time period among the plurality of first level values; calculating the sum of squares of a plurality of first level values in a plurality of consecutive first unit time periods as a first detection value; defining a plurality of second level values which is determined by the proportion of a duration of the conduction state in a second unit time period and calculating a second level value in the second unit time period among the plurality of second level values; and calculating the sum of squares of a plurality of second level values in a plurality of consecutive second unit time periods as a second detection value, wherein when the first detection value is equal to or smaller than a predetermined value, a value obtained by multiplying the second detection value with a constant determined so as to correspond to the second detection value is used as a measurement value.

According to this method, it is possible to calculate the acceleration using a sensor which consumes less power and which includes a pair of electrodes disposed so as to face each other so that mutual positional relationship is fixed, and a movable spherical conductor disposed between the pair of electrodes so as to put the pair of electrodes into either a conduction state or a non-conduction state. By calculating the measurement value based on the second detection value when the first detection value is equal to or smaller than the predetermined value, it is possible to broaden the calculation range of the acceleration. The first detection value calculated based on the first level value correlates with the acceleration of the sensor-attached object within a specific range of accelerations. Since the second detection value is calculated from a level value in the second unit time period having a length different from the length of the first unit time period, when the same acceleration was measured, the second detection value has a different value from the first detection value. Thus, it is possible to make a range where the second detection value correlates with the acceleration of the sensor-attached object broader than the range where the first detection value correlates with the acceleration of the sensor-attached object. Although, the second detection value has a different value from the acceleration of the sensor-attached object, by multiplying the second detection value with a constant which is determined so as to correspond to the value of the second detection value, it is possible to obtain a measurement value which can be used. The predetermined value and the constant which is determined so as to correspond to the value of the second detection value can be calculated through experiments or simulations.

APPLICATION EXAMPLE 4

In the motion state detection method according to the application example of the invention, it is preferable that the length of the second unit time period is ½ of the first unit time period.

According to this method, by setting the length of the second unit time period so as to be ½ of the length of the first unit time period, it is possible to make a range where the second detection value correlates with the acceleration of the sensor-attached object broader than the range where the first detection value correlates with the acceleration of the sensor-attached object.

APPLICATION EXAMPLE 5

According to this application example of the invention, there is provided a motion state detector including: a sensor which includes a pair of electrodes disposed so as to face each other so that mutual positional relationship is fixed, and a movable spherical conductor disposed between the pair of electrodes so as to put the pair of electrodes into either a conduction state or a non-conduction state; and an arithmetic processor that detects at least one of a change from the conduction state to the non-conduction state and a change from the non-conduction state to the conduction state as a detection state and calculates a measurement value from the detection state, wherein the arithmetic processor is configured to: define a plurality of level values which is determined by the proportion of a duration of the conduction state in a unit time period; calculate a level value in the unit time period among the plurality of level values as a first level value; add a second predetermined value to the first level value to calculate a second level value; calculate the sum of squares of a plurality of first level values in a plurality of consecutive unit time periods as a first detection value and calculate the sum of squares of a plurality of second level values as a second detection value; use the first detection value as a measurement value when the first detection value is equal to or smaller than a first predetermined value; and use the second detection value as the measurement value when the first detection value is larger than the first predetermined value.

According to this detector, it is possible to calculate the acceleration using a sensor which consumes less power and which includes a pair of electrodes disposed so as to face each other so that mutual positional relationship is fixed, and a movable spherical conductor disposed between the pair of electrodes so as to put the pair of electrodes into either a conduction state or a non-conduction state. By calculating the first and second detection values, it is possible to broaden the calculation range of the acceleration. The sensor is configured so that the spherical conductor is more likely to adhere to the electrodes as the applied acceleration increases. Thus, the detection count of the detection state in a unit time period has a certain upper limit. Therefore, the first detection value calculated based on the first level value has a certain upper limit. When the value of the acceleration of an object to which the sensor is attached is equal to or larger than the first predetermined value, the difference between the first detection value and the value of the acceleration of the sensor-attached object increases gradually. The first predetermined value is a value at which the difference between the first detection value and the value of the acceleration of the sensor-attached object cannot be ignored. Therefore, by using the second detection value, as the measurement value, which is calculated based on the second level value obtained by adding the second predetermined value to the first level value at the point in time when the first detection value is larger than the first predetermined value, it is possible to increase the upper limit of the acceleration measurement range of the sensor-attached object to be larger than the first predetermined value, thus broadening the measurement range. The second predetermined value is a value which is determined by the detection condition of the detection state. The first and second predetermined values can be calculated through experiments or simulations, for example.

APPLICATION EXAMPLE 6

In the motion state detector according to the application example of the invention, it is preferable that the second predetermined value is determined based on a detection count of the detection state.

According to this detector, since the spherical conductor is more likely to adhere to the pair of electrodes for a longer period as the acceleration increases, and thus, the detection count of the detection state decreased accordingly, the second predetermined value can be determined based on the detection count of the detection state.

APPLICATION EXAMPLE 7

According to this application example of the invention, there is provided a motion state detector including: a sensor which includes a pair of electrodes disposed so as to face each other so that mutual positional relationship is fixed, and a movable spherical conductor disposed between the pair of electrodes so as to put the pair of electrodes into either a conduction state or a non-conduction state; and an arithmetic processor that detects at least one of a change from the conduction state to the non-conduction state and a change from the non-conduction state to the conduction state as a detection state and calculates a measurement value from the detection state, wherein the arithmetic processor is configured to: define a plurality of first level values which is determined by the proportion of a duration of the conduction state in a first unit time period; calculate a first level value in the first unit time period among the plurality of first level values; calculate the sum of squares of a plurality of first level values in a plurality of consecutive first unit time periods as a first detection value; define a plurality of second level values which is determined by the proportion of a duration of the conduction state in a second unit time period; calculate a second level value in the second unit time period among the plurality of second level values; calculate the sum of squares of a plurality of second level values in a plurality of consecutive second unit time periods as a second detection value; and use a value obtained by multiplying the second detection value with a constant determined so as to correspond to the second detection value as a measurement value when the first detection value is equal to or smaller than a predetermined value.

According to this detector, it is possible to calculate the acceleration using a sensor which consumes less power and which includes a pair of electrodes disposed so as to face each other so that mutual positional relationship is fixed, and a movable spherical conductor disposed between the pair of electrodes so as to put the pair of electrodes into either a conduction state or a non-conduction state. By calculating the measurement value based on the second detection value when the first detection value is equal to or smaller than the predetermined value, it is possible to broaden the calculation range of the acceleration. The first detection value calculated based on the first level value has correlation with the acceleration of the sensor-attached object within a specific range of accelerations. Since the second detection value is calculated from a level value in the second unit time period having a length different from the length of the first unit time period, when the same acceleration was measured, the second detection value has a different value from the first detection value. Thus, it is possible to make a range where the second detection value correlates with the acceleration of the sensor-attached object broader than the range where the first detection value correlates with the acceleration of the sensor-attached object. Although the second detection value has a different value from the acceleration of the sensor-attached object, by multiplying the second detection value with a constant which is determined so as to correspond to the value of the second detection value, it is possible to obtain a measurement value which can be used. The predetermined value and the constant which is determined so as to correspond to the value of the second detection value can be calculated through experiments or simulations.

APPLICATION EXAMPLE 8

In the motion state detector according to the application example of the invention, it is preferable that the length of the second unit time period is ½ of the first unit time period.

According to this detector, by setting the length of the second unit time period so as to be ½ of the length of the first unit time period, it is possible to make a range where the second detection value correlates with the acceleration of the sensor-attached object broader than the range where the first detection value correlates with the acceleration of the sensor-attached object.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of a motion state detection method and a motion state detector according to the invention will be described with reference to the drawings.

First Embodiment

Figure 1:
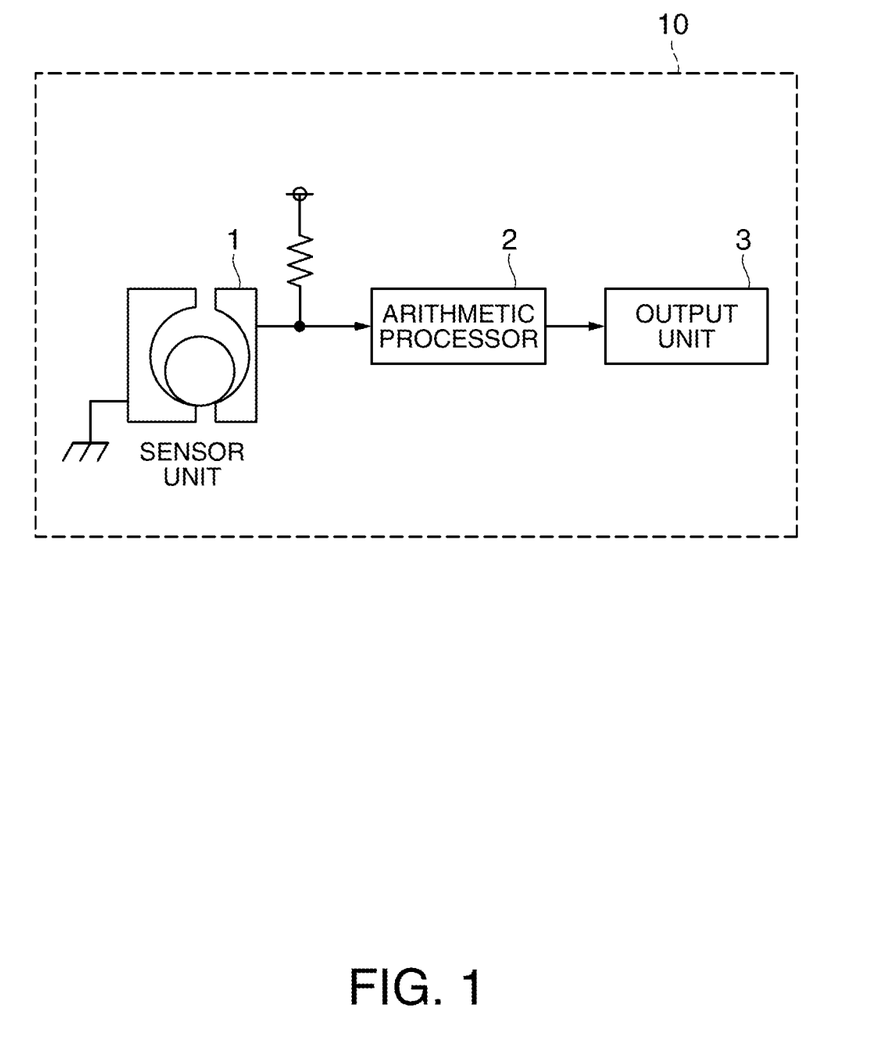
FIG. 1 shows a block diagram of a motion state detector.

FIG. 1 shows a motion state detector 10 of this embodiment. The motion state detector 10 includes at least a sensor unit 1, an arithmetic processor 2, and an output unit 3 shown in FIG. 1. The sensor unit 1 includes a pair of electrodes which is held in an insulated state and of which the mutual positional relationship is fixed and a movable spherical conductor which is movable within a space formed between the pair of electrodes. The arithmetic processor 2 detects a change in the state of the sensor unit 1 from an output value of the sensor unit 1, generates a measurement value from the detected state change, and output the measurement value to the output unit 3. The output unit 3 output the measurement value to a corresponding output destination of the motion state detector 10. The output destination may be a display unit which uses liquid crystals or the like, and when the motion state detector 10 has a host device, the measurement value may be transmitted to the host device as data. In the following description, it will be described that the conduction state of the sensor unit 1 is the On state, and the non-conduction state is the Off state.

First Example

Figure 2:
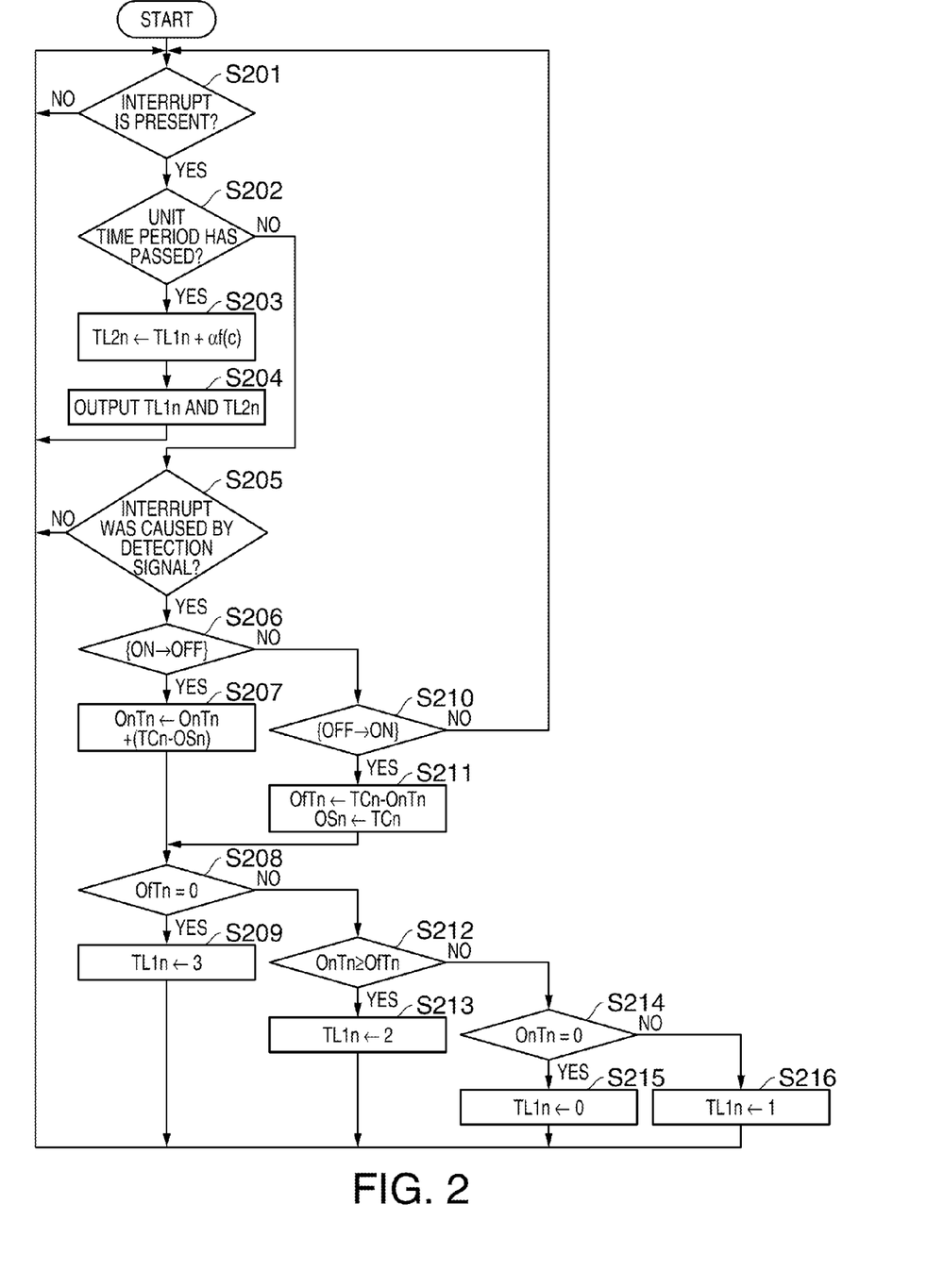
FIG. 2 is a flowchart of a level calculation process.
Figure 3:
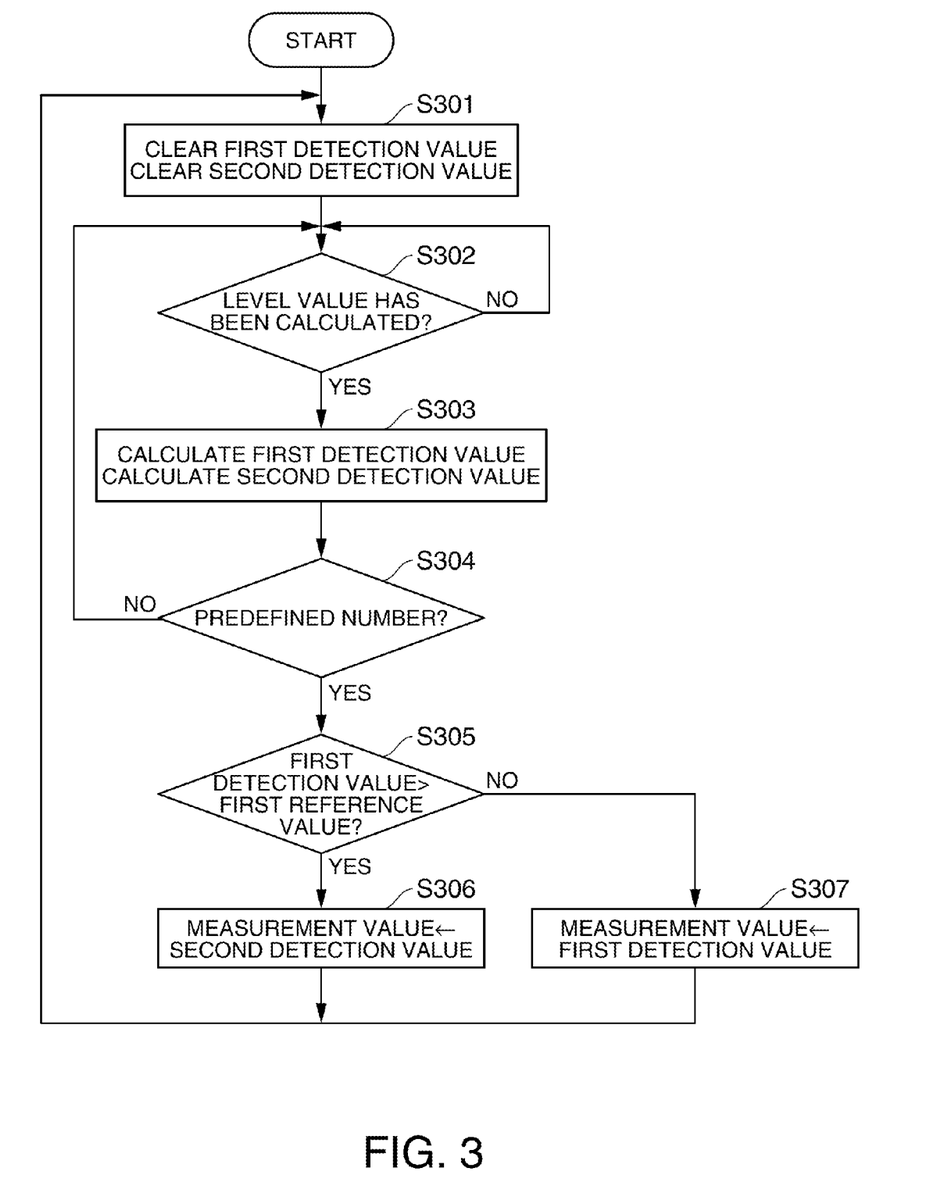
FIG. 3 is a flowchart of a measurement value calculation process according to a first example.

In this example, the arithmetic processor 2 calculates a first detection value from a first level value and calculates a second detection value from a second level value. When the first detection value is equal to or smaller than a predetermined value, the first detection value is used as a measurement value. When the first detection value is larger than the predetermined value, the second detection value is used as the measurement value. FIGS. 2 and 3 show the flowcharts of apart of the processes executed by the arithmetic processor 2 of this example. The arithmetic processor 2 also performs an overall control and management process of the motion state detector 10 such as an internal interrupt process of the motion state detector 10. In order to make the description of the embodiment and examples of the invention understood as easily as possible, the flowchart particularly of the control and management process is not illustrated in this embodiment since such a process belongs to the range of so-called design matters. For example, a control of resetting an interrupt flag or the like is not illustrated.

When the motion state detector 10 is turned on, a power-on reset operation is first performed for the arithmetic processor 2 and the output unit 3. When the power-on reset operation ends, a controller (not shown) in the arithmetic processor 2 is started. Then, the operation modes or parameters of the arithmetic processor 2 and the output unit 3 are set by the controller. When the operation modes or parameters are set, the arithmetic processor 2 and the output unit 3 perform operations in accordance with the settings. FIGS. 2 and 3 show the processing flows after the operation modes or parameters are set.

Next, description will be made with reference to FIG. 2. FIG. 2 is a flowchart of a process of calculating the first and second levels. As described above, when the process shown in the flowchart of FIG. 2 is started, the motion state detector 10 has finished the settings of the operation modes and parameters. In this example, the process of calculating the first and second level values $TL1n$ and $TL2n$ is one of the interrupt processes of the arithmetic processor 2. The interrupts related to the processing of the first and second level values $TL1n$ and $TL2n$ are an interrupt representing changes in the On/Off state of the sensor unit 1 and an interrupt representing the passage of a unit time period. The occurrence of such interrupts is detected and determined in processes S201, S202, and S205 in FIG. 2.

First, it is determined whether the interrupt was caused by the passage of a unit time period (FIG. 2: process S202). When the interrupt was caused by the passage of a unit time period, the second level value $TL2n$ is calculated (FIG. 2: process S203). The first and second level values $TL1n$ and $TL2n$ are output to a processing unit (not shown) of the arithmetic processor 2, which calculates the first and second detection values (FIG. 2: process S204). When the interrupt was not caused by the passage of the unit time period, it is determined whether the interrupt was caused by a detection of a change in the state of the sensor unit 1 (FIG. 2: process S205). When the interrupt was caused by a change in the state of the sensor unit 1, it is first determined whether or not the state change represents a change from On to Off (FIG. 2: process S206). When the state was changed from On to Off, an accumulated On time $OnTn$ is calculated (FIG. 2: process S207). When the state was changed from Off to On, an accumulated Off time $OfTn$ is calculated (FIG. 2: processes S210 and S211).

After calculating the accumulated On and Off times $OnTn$ and $OfTn$, the first level value $TL1n$ is calculated by processes S208, S209, S212, S213, S214, S215, and S216, and the flow returns to a process (FIG. 2: process S201) of detecting the occurrence of a next interrupt. The first level value $TL1n$ calculated during the unit time period is a temporary level value calculated at the time when the interrupt occurs. As described above, by the processes shown in the flowchart of FIG. 2, the first and second level values $TL1n$ and $TL2n$ in the unit time period are calculated whenever the unit time period has passed.

The suffixes n of the variables such as the first level value $TL1n$ and the accumulated On time $OnTn$ are integers of 0 or more. That is, there is a plurality of groups of variables. When the unit time periods are switched, the values of a group of variables different from the group of variables used in the previous unit time period are cleared, and the cleared group of variables is used. In this case, the first level value $TL1n$ is cleared and set in accordance with the state of the sensor unit 1 before the unit time periods are switched. That is, if the sensor unit 1 was in the On state when the unit time period was switched, the first level value $TL1n$ is set to 3. If the sensor unit 1 was in the Off state at that time, the first level value $TL1n$ is set to 0. The reason why the number of variable groups is plural is as follows. When one unit time period ends and the next unit time period begins, if the variables are cleared in order to perform measurement in the next unit time period, it is not possible to perform calculation using the first and second level values $TL1n$ and $TL2n$ calculated in the previous unit time period. In this example, switching of the variable groups and clearing of the values are performed by the controller of the arithmetic processor 2.

Next, description will be made with reference to FIG. 3. FIG. 3 is the flowchart of a measurement value calculation process. First, the first and second detection values are cleared (FIG. 3: process S301). After that, it is determined whether or not a new level value was calculated (FIG. 3: process S302). If a new level value was calculated, it means that one unit time period has passed. The new first and second level values $TL1n$ and $TL2n$ calculated by the process of the flowchart shown in FIG. 2 are used for the calculation of the first and second detection values in the loop of the processes S302, S303, and S304 in FIG. 3. The first and second detection values are calculated in process S303 of FIG. 3 using Equation (1) below.

$$a = k \sum_{t=0}^{T} \{V(t)\}^2 \tag{1}$$

In Equation (1), "$V(t)$" represents the value of the first level value $TL1n$ or the second level value $TL2n$. In Equation (1), "T" represents the number of unit time periods used for defining an acceleration. The value "T" corresponds to a predefined number in process 304 of FIG. 3. Moreover, "k" is a proportional constant.

Figure 5:
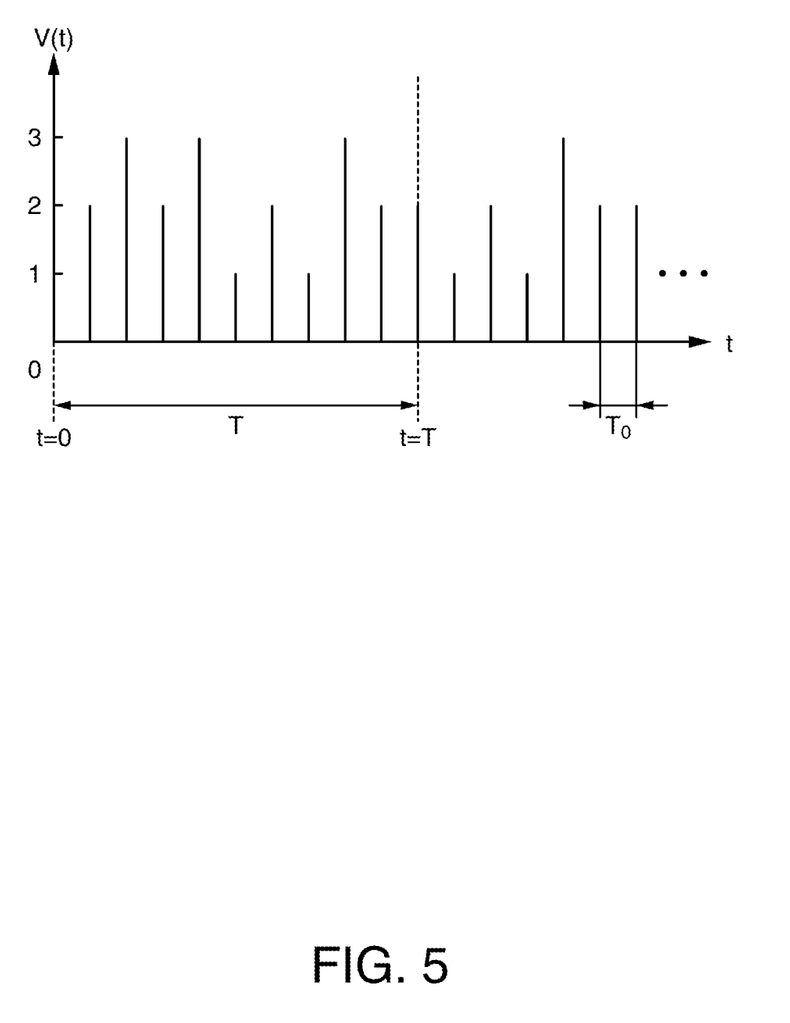
FIG. 5 shows changes in the level value.

An example of the relationship between "T" and "$V(t)$" is shown in FIG. 5. In FIG. 5, "$T0$" represents the length of a unit time period. It is preferable that "$T0$" is set to be within 1 second, and "T" is set to be within 10 seconds. Referring to FIG. 5, $T0$ has a duration of 0.1 second, and T has a duration of 1 second in which 10 consecutive $T0$ periods are included.

Figure 6A:
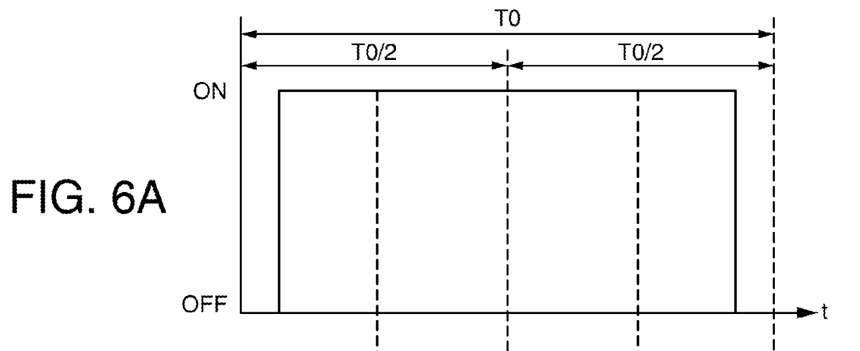
FIGS. 6A to 6C show examples of a conduction state in a unit time period.
Figure 6B:
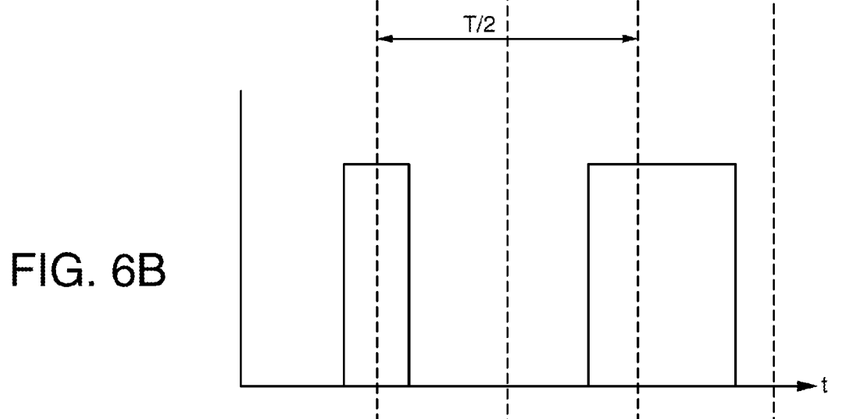
Figure 6C:
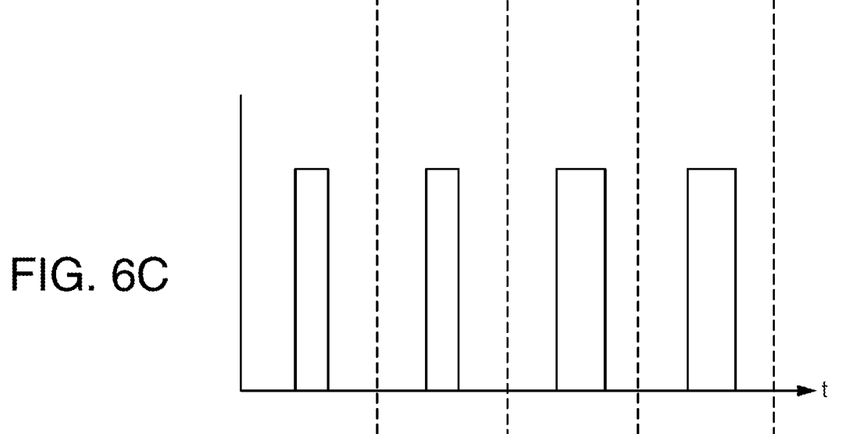
Figure 7:
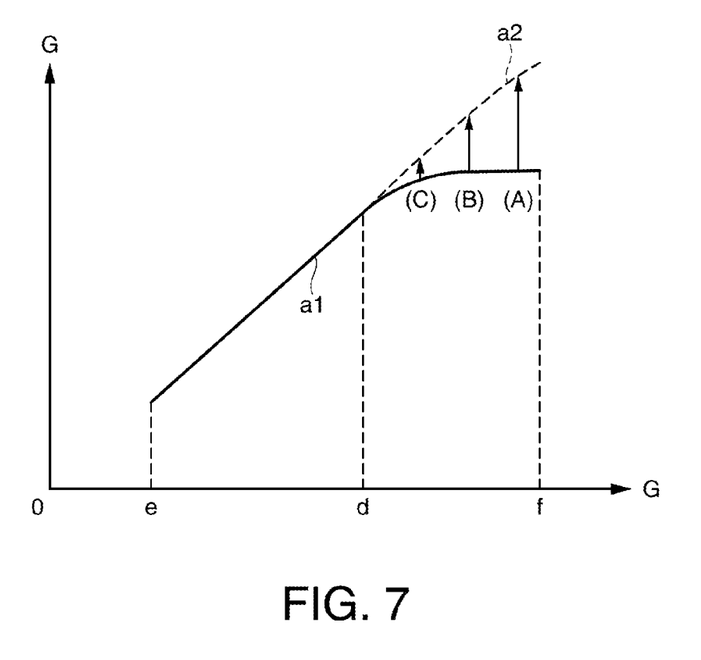
FIG. 7 shows the measurement value obtained with the first example.

FIG. 7 shows the first detection value (solid line: a1) and part (dotted line: a2) of the second detection value obtained in this example. The horizontal axis in FIG. 7 represents an acceleration applied to the motion state detector 10 by a vibration exciter, and the vertical axis represents a measurement value (acceleration) of the motion state detector 10. The value "d" in FIG. 7 is a first predetermined value used for determining which one of the first and second detection values will be used. FIGS. 6A, 6B, and 6C are diagrams showing the On state of the sensor unit 1 during one unit time period $T0$ at each of the points (A), (B), and (C) in FIG. 7. The level values corresponding to the points (A), (B), and (C) in FIG. 7 are all the same as 2. However, actually, the total On time of the sensor unit 1 is different in accordance with the acceleration of the vibration exciter applied to the sensor unit 1. The On time of the sensor unit 1 increases as the acceleration applied by the vibration exciter increases. In other words, as the applied acceleration increases, the number of On/Off switchings of the sensor unit 1 decreases. Therefore, by correcting the first detection value based on the On time of the sensor unit 1 or the number of On/Off switchings, it is possible to broaden the range where the acceleration applied by the vibration exciter and the measurement value of the motion state detector 10 correlate.

In this example, the detection value was corrected using a pulse count calculated based on the number of On/Off switchings of the sensor unit 1. The calculation expression described in process S203 of FIG. 2 corresponds to this correction. That is, the second level value TL$2n$ is obtained by adding a second predetermined value $\alpha f(c)$ to the first level value TL$1n$. In this example, $\alpha=2$ and $f(c)=1/C$ (C: On-pulse count) were used. Under these conditions, the second level values TL$2n$ were 5, 4, and 3.5 in FIGS. 6A, 6B, and 6C, respectively.

As can be understood from FIG. 7, although the measurement range for the first detection value was limited to the range of e to d, by using the second detection value as the measurement value when the first detection value is larger than the first predetermined value d, it was possible to broaden the measurement range of the motion state detector 10 to the range of e to f. Although the process of measuring the pulse count is not illustrated in the flowchart of FIG. 2, the pulse count can be measured by using the determination results in the processes S206 and S210 of FIG. 2.

Second Example

In this example, a reference value is determined from a first detection value in a first unit time period, and when the detection value is equal to or smaller than the reference value, the acceleration is calculated based on a third detection value in a second unit time period. In this example, the length of the second unit time period was set to ½ of the length of the first unit time period. Like the first example, matters belonging to so-called design matters will not be described for convenience's sake. In order to obviate unnecessary confusion, the level value and the detection value (sum of squares) in the second unit time period will be expressed as a third level value and a third detection value since the expressions the second level value and the second detection value have already been used in the first example.

First, a range where the acceleration applied to the motion state detector 10 by the vibration exciter and the first detection value correlate is calculated. The maximum value of the first detection value in the correlation range is used as a reference value. Subsequently, when the first detection value is equal to or smaller than the reference value, a multiplication factor (for example, $\alpha'$ and $\alpha''$ described in processes S410 and 411 of FIG. 4) is calculated from the acceleration applied to the motion state detector 10 by the vibration exciter and the third detection value. The multiplication factor is used for calculating the measurement value. In this example, the level values are calculated by the same method as used in the first example, and description thereof will be omitted.

Figure 4:
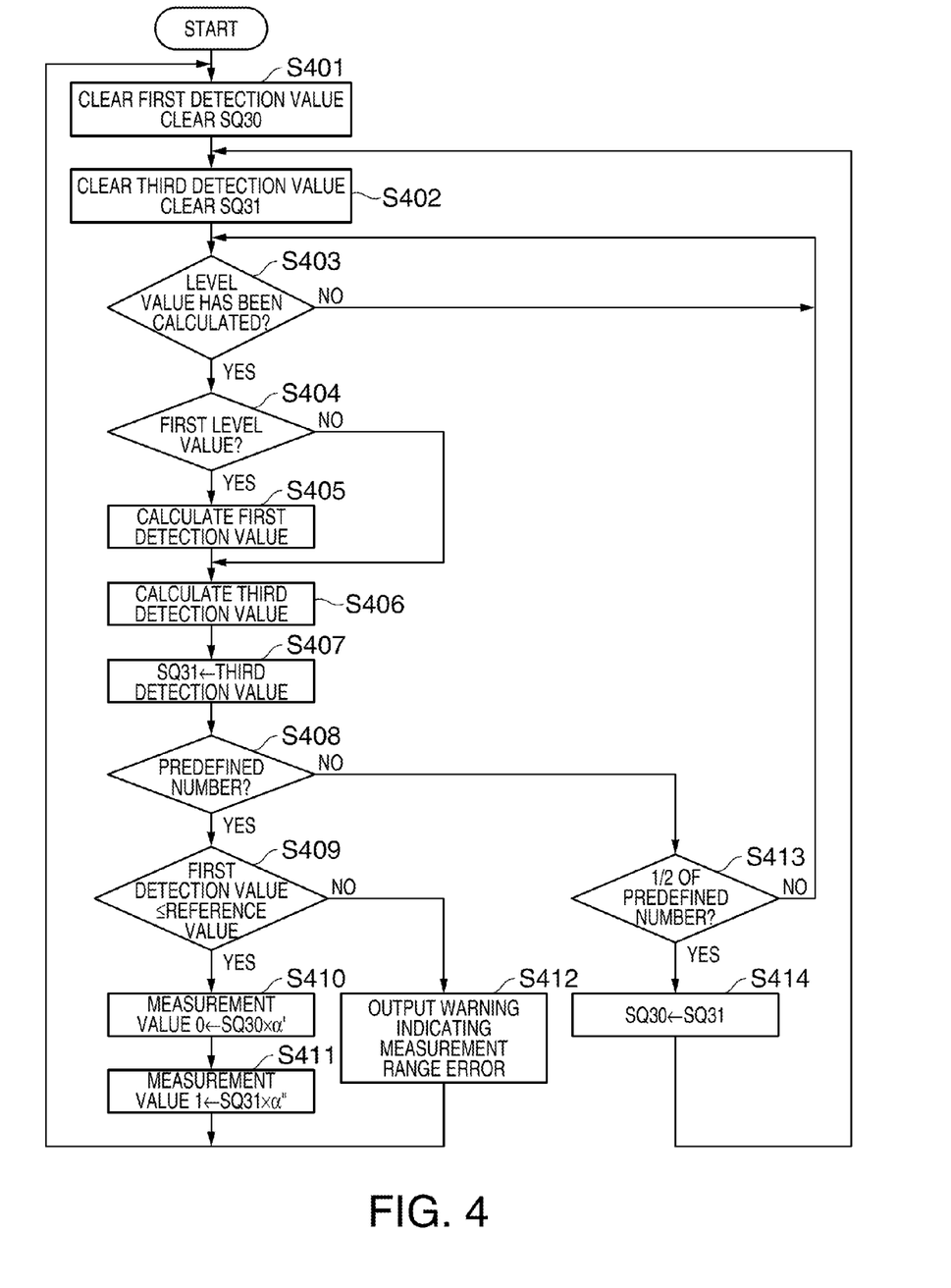
FIG. 4 is a flowchart of a measurement value calculation process according to a second example.

FIG. 4 is a flowchart of a process of calculating the measurement value from the third detection value after the reference value was determined. First, the first detection value and a variable SQ30 are cleared (FIG. 4: process S401), and the third detection value and a variable SQ31 are cleared (FIG. 4: process S402). Subsequently, it is determined whether or not a new level value was calculated (FIG. 4: process S403). If a new level value was calculated, it is determined whether or not the first level value was calculated (FIG. 4: process S404). If the first level value was calculated, the first detection value is calculated (FIG. 4: process S405). As described above, in this example, the length of the second unit time period is ½ of the length of the first unit time period. Moreover, the starting point of the first unit time period is set to be the same as the starting point of the second unit time period. When the level values are calculated under these conditions, there may be two cases: one is a case where only the third level value is calculated; and the other is a case where both the first and third level values are calculated. The third detection value is calculated in process S406 of FIG. 4 subsequently to process S404 or S405 of FIG. 4, and the third detection value is held in the variable SQ31 (FIG. 4: process S407). In the flowchart of FIG. 4, it is assumed that the starting point of the first unit time period is the same as the starting point of the third unit time period.

Subsequently, it is determined whether or not the first level value was calculated for a predefined number of times (FIG. 4: process S408). If the number of calculations has not reached the predefined number, it is determined whether the number of calculations is ½ of the predefined number (FIG. 4: process S413). If the determination result is negative in both of the processes S408 and S413, the flow returns to the process of determining whether or not the level value was calculated (FIG. 4: process S403). If the number of calculations of the first level value is ½ of the predefined number, the value of the variable SQ31 is held in the SQ30 (FIG. 4: process S414), and the flow returns to process S402 of FIG. 4. If the number of calculations of the first level value is ½ of the predefined number, it means that the second unit time period has passed. If it is determined in process S408 of FIG. 4 that the number of calculations of the first level value is smaller than the predefined number, it is not possible to determine whether the calculated third detection value can be used for the calculation of the measurement value.

If it is determined in process S408 of FIG. 4 that the first level value was calculated for the predefined number of times, it is determined whether or not the first detection value is equal to or smaller than the reference value (FIG. 4: process S409). If the first detection value is larger than the reference value, a code indicating that an error has occurred in the measurement range is output to an output device of the motion state detector 10 through the output unit 3 (FIG. 4: process S412). The output device may be a display unit attached to the motion state detector 10, and if a host device or the like is present, the output device may be the host device or the like. When the process S412 of FIG. 4 is executed, the flow returns to process S401 of FIG. 4.

If the first detection value is equal to or smaller than the reference value, the acceleration in the second unit time period in the first half of the first unit time period is calculated as the measurement value 0 using a value which is obtained by multiplying the value of the variable SQ30 with $\alpha'$ (FIG. 4: process S410). Moreover, the acceleration in the second unit time period in the second half of the first unit time period is calculated as the measurement value 1 using a value which is obtained by multiplying the value of the variable SQ31 with $\alpha''$ (FIG. 4: process S411). As described above, the multiplication factors $\alpha'$ and $\alpha''$ used were obtained by performing evaluation using the vibration exciter.

Figure 8:
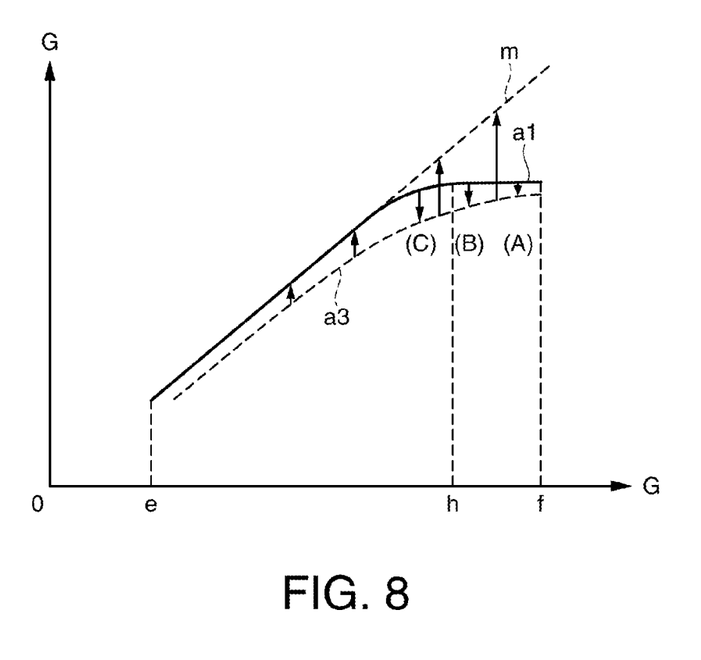
FIG. 8 shows the measurement value obtained with the second example.

FIG. 8 shows the first detection value a1, the third detection value a3, and the measurement value m obtained in this example. The horizontal axis in FIG. 8 represents an acceleration applied to the motion state detector 10 by a vibration exciter, and the vertical axis represents the acceleration corresponding to the first detection value a1, the third detection value a3, and the measurement value m. In the range of h to f in FIG. 8, the first detection value a1 has no correlation with the acceleration applied by the vibration exciter. Moreover, although the calculated third detection value a3 is generally smaller than the actual acceleration, in the range of e to f in FIG. 8, the third detection value a3 correlates with the acceleration applied by the vibration exciter. Therefore, by using the value of the first detection value a1 corresponding to the point h in FIG. 8 as the reference value, and calculating the measurement value m based on the third detection value when the first detection value is equal to or smaller than the reference value, it was possible to broaden the measurement range to the range of e to f in FIG. 8. In contrast, when the measurement value m was calculated based on the first detection value, it was only possible to perform the measurement within the range of e to h in FIG. 8.

Next, the dependence of the level value on the length of the unit time period will be described briefly with reference to FIGS. 6A to 6C. FIGS. 6A, 6B, and 6C are diagrams showing the On state of the sensor unit 1 during one unit time period T0 at the points (A), (B), and (C) in FIG. 7. The level values corresponding to the points (A), (B), and (C) in FIG. 7 are all the same as 2 in the unit time period T0. However, when the unit time period is set to T0/2, the level values in the first half of the unit time period T0/2 were 2, 1, and 1 at the points (A), (B), and (C) in FIG. 7 respectively, and the level values in the second half of the unit time period T0/2 were 2, 2, and 1 at the points (A), (B), and (C) in FIG. 7 respectively. From the above, it can be understood that the level values can be adjusted by adjusting the length of the unit time period. In this example, although the starting point of the first unit time period is the same as the starting point of the second unit time period, the relation between the first and second unit time periods is not limited to this. Basically, the relation ideal for an application is found through experiments or simulations and used.

As described above, by applying the invention, it is possible to calculate the acceleration using a sensor which consumes less power than the acceleration sensor and which includes a pair of electrodes and a movable conductor disposed between the pair of electrodes. In this way, a motion detection unit used for controlling a monitoring device or equipment which is used to monitor a person's state can be replaced with one which consumes less power.

The entire disclosure of Japanese Patent Application No. 2010-029844, filed Feb. 15, 2010 is expressly incorporated by reference herein.

What is claimed is:

1. A motion state detector comprising:
a sensor which includes
a pair of electrodes disposed so as to face each other so that mutual positional relationship is fixed, and
a movable spherical conductor disposed between the pair of electrodes so as to put the pair of electrodes into either a conduction state or a non-conduction state; and
an arithmetic processor that detects at least one of a change from the conduction state to the non-conduction state and a change from the non-conduction state to the conduction state as a detection state and calculates a measurement value from the detection state,
wherein the arithmetic processor is configured to:
define a plurality of level values which is determined by the proportion of a duration of the conduction state in a unit time period;
calculate a level value in the unit time period among the plurality of level values as a first level value;
add a second predetermined value to the first level value to calculate a second level value;
calculate the sum of squares of a plurality of first level values in a plurality of consecutive unit time periods as a first detection value and calculate the sum of squares of a plurality of second level values as a second detection value;
use the first detection value as a measurement value when the first detection value is equal to or smaller than a first predetermined value; and
use the second detection value as the measurement value when the first detection value is larger than the first predetermined value.

2. The motion state detector according to claim 1, wherein the second predetermined value is determined based on a detection count of the detection state.

3. A motion state detection method which uses
a pair of electrodes disposed so as to face each other so that mutual positional relationship is fixed, and
a movable spherical conductor disposed between the pair of electrodes so as to put the pair of electrodes into either a conduction state or a non-conduction state,
the method comprising:
defining a plurality of level values which is determined by the proportion of a duration of the conduction state in a unit time period and calculating a level value in the unit time period among the plurality of level values as a first level value;
adding a second predetermined value to the first level value to calculate a second level value; and
calculating the sum of squares of a plurality of first level values in a plurality of consecutive unit time periods as a first detection value and calculating the sum of squares of a plurality of second level values as a second detection value,
wherein when the first detection value is equal to or smaller than a first predetermined value, the first detection value is used as a measurement value, and
wherein when the first detection value is larger than the first predetermined value, the second detection value is used as the measurement value.

4. The motion state detection method according to claim 3, wherein at least one of a change from the conduction state to the non-conduction state and a change from the non-conduction state to the conduction state is detected as a detection state, and
wherein the second predetermined value is determined based on a detection count of the detection state.

5. A motion state detection method which uses
a pair of electrodes disposed so as to face each other so that mutual positional relationship is fixed, and
a spherical conductor disposed between the pair of electrodes so as to put the pair of electrodes into either a conduction state or a non-conduction state,
the method comprising:
defining a plurality of first level values which is determined by the proportion of a duration of the conduction state in a first unit time period and calculating a first level value in the first unit time period among the plurality of first level values;
calculating the sum of squares of a plurality of first level values in a plurality of consecutive first unit time periods as a first detection value;
defining a plurality of second level values which is determined by the proportion of a duration of the conduction state in a second unit time period and calculating a second level value in the second unit time period among the plurality of second level values; and calculating the sum of squares of a plurality of second level values in a plurality of consecutive second unit time periods as a second detection value, wherein when the first detection value is equal to or smaller than a predetermined value, a value obtained by multiplying the second detection value with a constant determined so as to correspond to the second detection value is used as a measurement value.

6. The motion state detection method according to claim 5, wherein the length of the second unit time period is ½ of the first unit time period.

* * * * *